United States Patent [19]

Pitre, Jr. et al.

[11] Patent Number: 5,621,598
[45] Date of Patent: Apr. 15, 1997

[54] LUMINOUS TUBE PROTECTION CIRCUIT

[75] Inventors: John W. Pitre, Jr.; Jere D. Whorton, both of Houston, Tex.

[73] Assignee: Tekneon Corporation, Houston, Tex.

[21] Appl. No.: 478,894

[22] Filed: Jun. 7, 1995

Related U.S. Application Data

[63] Continuation of Ser. No. 580,957, Sep. 11, 1990, abandoned, which is a continuation-in-part of Ser. No. 441,821, Nov. 27, 1989, abandoned.

[51] Int. Cl.$^6$ ................................................. H02H 7/04
[52] U.S. Cl. ................................................ 361/35; 361/86
[58] Field of Search .......................... 361/18, 35–37, 361/59, 86, 87, 89, 90, 103; 323/265, 271, 276, 282–284, 907

[56] References Cited

U.S. PATENT DOCUMENTS

| | | | |
|---|---|---|---|
| 3,781,636 | 12/1973 | Genuit et al. | 361/18 |
| 3,793,559 | 2/1974 | Ristuccia | 361/37 |
| 4,210,947 | 7/1980 | Koizumi | 361/103 |
| 4,612,617 | 9/1986 | Laplace, Jr. et al. | 364/483 |
| 4,727,448 | 2/1988 | Hanyuda et al. | 361/91 |
| 4,965,692 | 10/1990 | Burns et al. | 361/18 |
| 4,989,155 | 1/1991 | Begin et al. | 364/483 |
| 5,136,458 | 8/1992 | Durivage, III | 361/93 |

FOREIGN PATENT DOCUMENTS

| | | | |
|---|---|---|---|
| 1033329 | 5/1958 | Germany . | |
| 2139436 | 11/1984 | United Kingdom | H02H 3/06 |

*Primary Examiner*—Jeffrey A. Gaffin
*Assistant Examiner*—Ronald W. Leja
*Attorney, Agent, or Firm*—Conley, Rose & Tayon, P.C.

[57] ABSTRACT

A protection circuit for monitoring the power from a luminous tube transformer to a luminous tube including sensor connected to a secondary of the transformer, a window comparator circuit connected to the sensor and providing a fault signal when the sensor output exceeds the window limits, and a driver switching off power to the transformer primary when the driver receives a fault signal. A temperature compensation circuit monitors the ambient air temperature for providing a time delay before disconnecting the power supply until the luminous tube stabilizes, and also turns off the power supply when the ambient temperature exceeds upper and lower limits.

27 Claims, 19 Drawing Sheets

LUMINOUS TUBE PROTECTION CIRCUIT

CROSS REFERENCE TO RELATED APPLICATION

This application is a file wrapper continuation of application Ser. No. 07/580,957, filed Sep. 11, 1990 now abandoned which is a continuation of Ser. No. 07/441,821 filed Nov. 27, 1989, now abandoned.

FIELD OF THE INVENTION

The present invention is directed to a protection circuit for monitoring the secondary power and controlling the primary power of a luminous tube or neon transformer for detecting the occurrence of electrical faults and disconnecting power upon detection.

In the majority of luminous tube or neon signs, the high voltage required to ionize the gas is produced by a conventional wound type transformer. This voltage is an AC voltage at line frequency and may range from 2000 volts to 15,000 volts.

Many installations, however, utilize a luminous tube transformer. A luminous tube transformer is a unique type of transformer differing in construction and operating characteristics from all other types of transformers. It is constructed with a magnetic shunt added to the core to bypass extra lines of flux generated when the output current exceeds a designed-in limit. As the load increases causing the output current to increase, the extra lines of flux are shunted around the core preventing the secondary from delivering any more current to the load. And since Ohms law for A.C. in a resistive load states that E=IR, and if the current remains constant while the resistance decreases, then the voltage must decrease.

And this is exactly what happens. For example, a luminous tube transformer specified for 15,000 volts at 30 milliamps when operating into an open circuit (no load current), would produce 15,000 volts across the secondary terminals. When properly loaded, the output current would be about 25 milliamps and the rms voltage will have dropped to about 9,000 volts. As the load resistance is further decreased, the output current reaches 30 milliamps and stops while the output voltage continues to decrease until at zero resistance it is zero volts. And, since the current remains constant and voltage decreases, power dissipation also remains constant (Power=Current×Voltage). Therefore overloading causes no change in temperature of the transformer core or windings. In fact, a luminous tube transformer can be operated into a short circuit without any appreciable increase in temperature.

This is exactly opposite the operating characteristics of ordinary transformers in which the voltage remains constant and the output current increases as the load resistance decreases, which also causes the temperature of the core and windings to increase.

Although luminous tube transformers incorporate a magnetic shunt around part of the core that limits the output current to 120 milliamps or lower, the potential for arcing is still present.

When a live uninsulated conductor is brought close enough to a conductor of opposite polarity, or ground, arcover due to ionization of the air may occur. Even though this will not directly harm the transformer, it can cause improper operation of the sign and does present a very definite fire and shock hazard.

When considering luminous tube transformer secondary circuits, there are in reality four types of conditions which are of concern. These are: (1) short to opposite polarity or ground; (2) open circuit; (3) imbalanced load; (4) overload.

Because of the design of luminous tube transformers, none of these problems will cause a significant enough change in primary current to initiate any of the currently available protection devices such as fuses, circuit breakers or ground fault interruptors. Therefore, effective protection for luminous tube circuits can only be accomplished by determining critical changes in secondary circuit operating parameters, i.e., voltage and current.

The present invention provides a method of determining critical changes within these parameters and the means to protect the circuit when they occur.

SUMMARY OF THE INVENTION

One feature of the present invention is the provision of a dual sensor input circuit which allows the monitoring of the secondary circuit of any luminous tube transformer having either the center tap or one end grounded, and connected to luminous tubes in any of the currently accepted hook-up configurations.

An additional feature of the present invention is to provide for manual adjustment of the detected signal level from the sensor circuit so that it may be centered within the comparator circuit window. This allows compensation for differences between transformers of different outputs, different hook-up configurations, and load variations due to tube design.

Another object of the present invention is to provide a protection protocol that will ensure protection from legitimate problems while avoiding interrupted sign operation due to transient conditions. The logic circuitry incorporated in this device employs a 10 second automatic restart feature. When the primary power to the transformer is disconnected due to a fault condition, the logic circuit waits 10 seconds and attempts to restart. If the problem was temporary and no longer exists then operation continues normally. If the condition that caused the first fault is still present then the power is disconnected a second time and further restarts are prevented until the circuit is reset.

Still another object of the present invention is to delay detection at start up until the initial ionization of the gas stabilizes. The logic circuitry therefore prevents fault detection for a preset time from initial turn-on. The time required for ionization to stabilize depends on the ambient air temperature sensing circuit that changes the delay time according to the temperature. However, if the temperature is too low, the gas will not ionize properly and the sign should not be operated. Also, certain standards set the upper temperature limit at which luminous tube systems should be permitted to operate. Therefore, the temperature compensation circuit has preset upper and lower limits. If the ambient air temperature exceeds either of these limits, the initial startup of the sign will be prevented.

Another feature of the present invention is the use of a triac to switch power to the luminous tube transformer primary, driven by a zero crossing detector circuit. This enables the primary power to be disconnected within one-half cycle of the line frequency from the time of fault detection. It also reduces the possibility of a false turn-on due to line transients.

Further objects, features and advantages will be apparent from the following description of a present preferred embodiment of the invention, given for the purpose of disclosure, and taken in conjunction with the accompanying drawings.

DESCRIPTION OF THE PREFERRED EMBODIMENT

Figure 1:
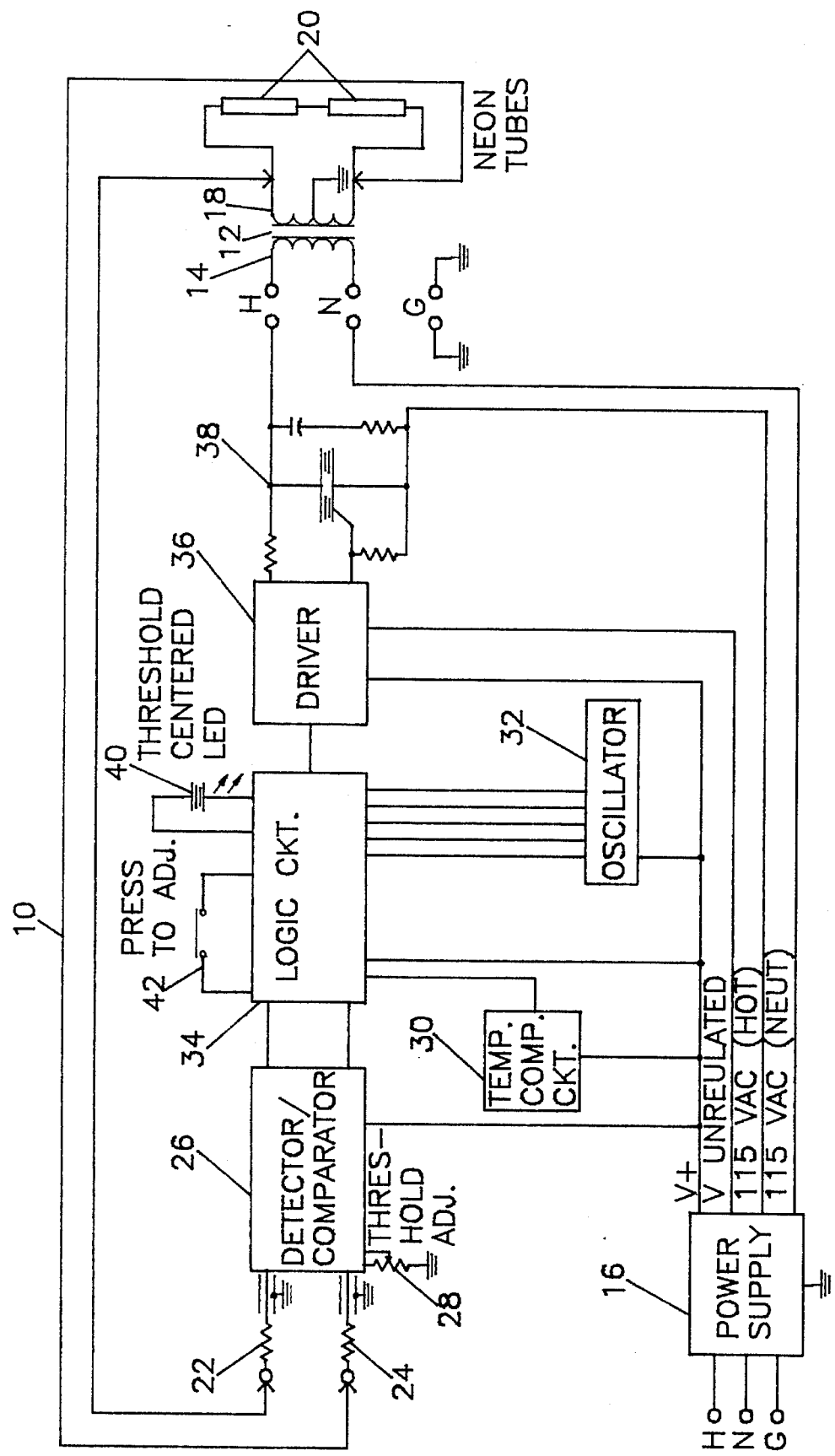
FIG. 1 is a functional block diagram of the present invention.

Referring now to the drawings, and particularly to FIG. 1, the reference 10 generally indicates the protection circuit of the present invention which includes a luminous tube transformer 12 having a primary 14 connected to a power supply 16, and a secondary 18 connected to a luminous or neon tube or tubes 20. Sensor means such as sensors 22 and 24 are connected to the secondary 18 of the transformer 12 in which the particular neon tube transformer is shown as having a center tap grounded. Other types of neon transformers may be controlled such as end grounded transformers. The sensors 22 and 24 reduce the detected voltage from the secondary 18 and provide an output to a detector/comparator circuit 26 which takes the signals from the sensors 22 and 24, half wave rectifies them, filters them, sums them and applies the result to a threshold adjusting potentiometer 28. A threshold adjusting potentiometer 28 determines the signal level that is then amplified and applied to the modified window comparator circuit in 26. The window comparator circuit provides a high fault signal or a low fault signal if the amplified detector signal exceeds one of the window limits.

A temperature compensation circuit 30 senses the ambient air temperature and accordingly selects an appropriate delay time for a logic circuit to recognize a fault signal from the comparator circuit, inhibits the logic circuit from generating a turn on command to a driver circuit, and also provides the function of inhibiting power to the transformer 12 in the event the ambient air temperature is above a maximum or below or a minimum.

An oscillator circuit 32 is provided utilizing a crystal oscillator for providing various timing functions.

A logic circuit 34 coordinates the start up process, monitors the high and low fault signals from the detector/comparator 26 and the output from the temperature compensation circuit 30 and acts on the signals to turn on or turn off the luminous transformer 12 primary power. In addition, the logic circuit provides a delay, for example 8–10 seconds after the first faulted turn off, to initiate a restart and in the event of a second faulted turn off, prohibit further application of primary power to the primary 14 of the transformer 12.

A driver circuit 36 is provided for turning on or off a triac switch 38 according to the command from the logic circuit 34. The driver circuit 36 also turns on a threshold centered LED 40 when the threshold adjust pot 28 signal is centered in the comparator window during the manual adjust mode of pressing the adjust switch 42.

The power supply 16 may provide any suitable voltages such as a plus 8 V regulated, and approximately plus 25 V unregulated, to the detector/comparator 26, temperature compensation circuit 30, oscillator circuit 32, logic circuit 34, and driver circuit 36, and 110 V line voltage to the triac switch circuit 38.

Sensor/Detector/Comparator Circuit

Figure 2:
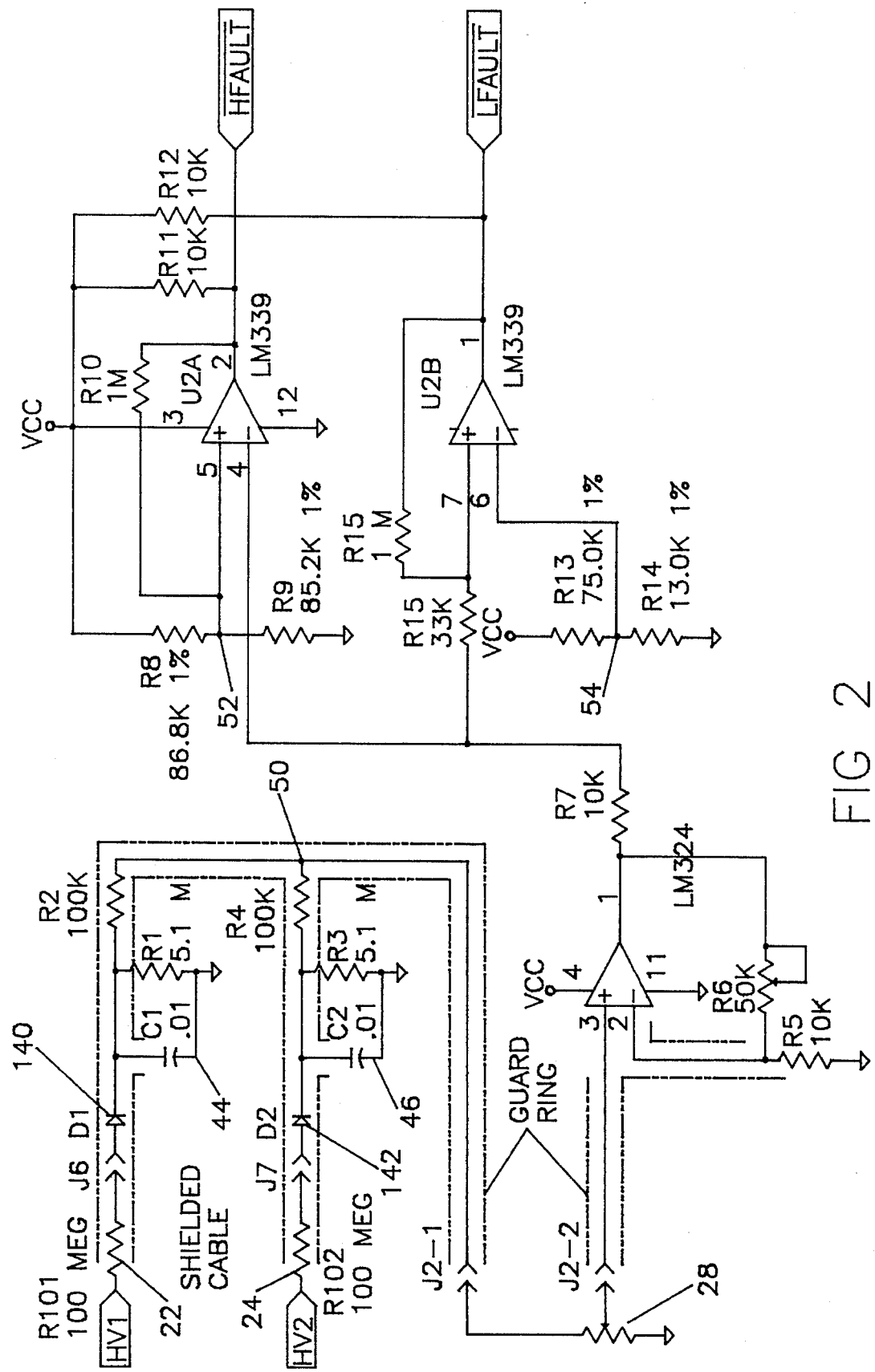
FIG. 2 is an electrical schematic of the sensor, detector and comparator circuits.
Figure 8:
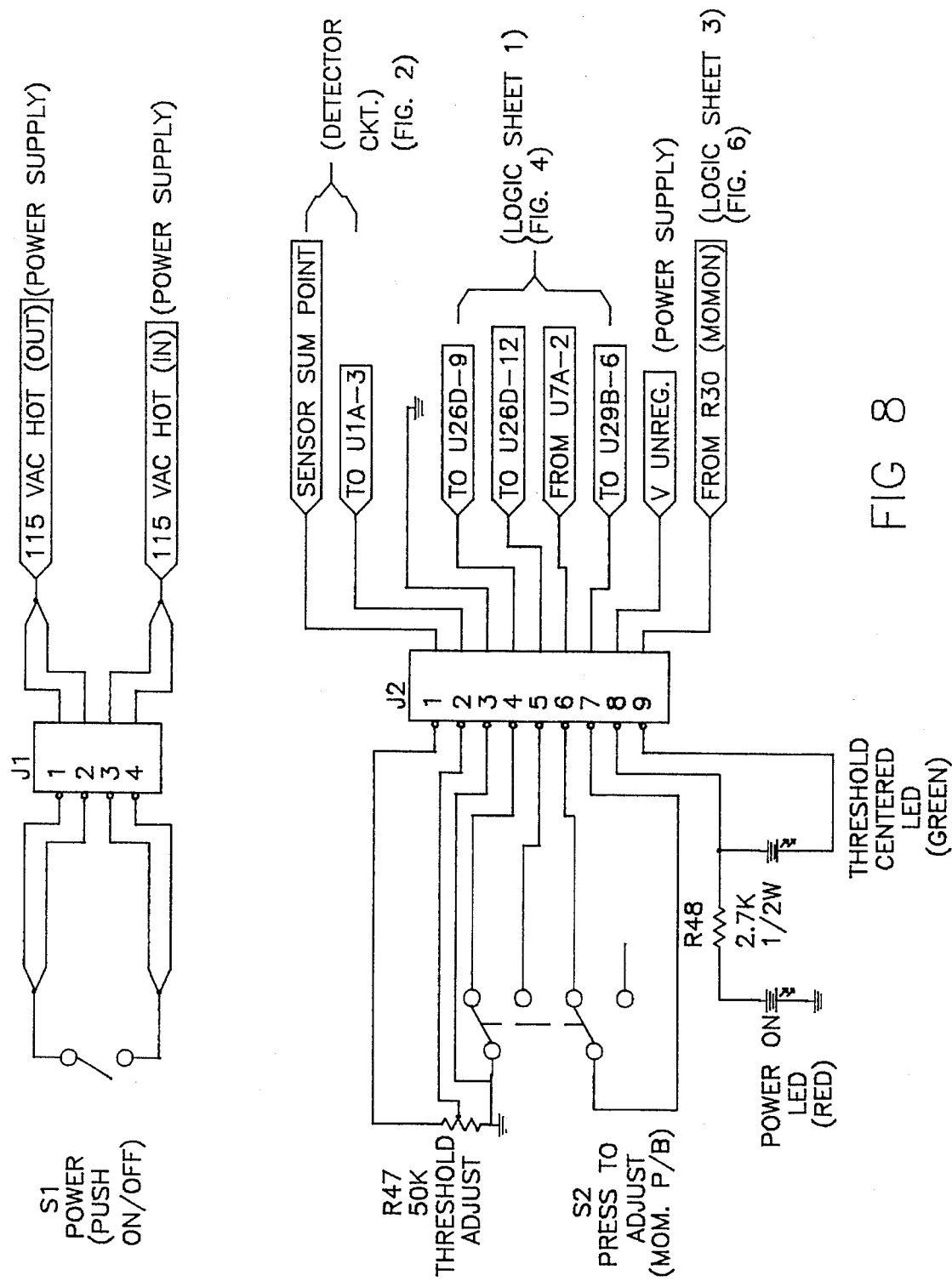
FIG. 8 is an electrical schematic of the front panel control circuitry.

Referring now to FIG. 2 and 8, each of the two identical sensors 22 and 24 may consist of a 100 megohm, high voltage resistor which are attached to the secondary 18 of the transformer 12. The signals from the output of the sensors 22 and 24 are an exact representation of the transformer secondary 18 wave form, only reduced by a substantial factor, such as 1000. The output signals from the sensors 22 and 24 are then positive half wave rectified by diodes 140 and 142, respectively, slightly smoothed by RC circuits 44 and 46, respectively, and summed at the reference point 50 and passed through the threshold adjust potentiometer 28 to ground.

Since the transformer 12 being monitored may be anywhere from 2000 V to 15000 V, the signal at the top of the threshold adjust pot 28 may vary between 20 V and as much as 100 V, also depending on the load conditions of the transformer. Therefore, the threshold adjust pot 28, is adjusted to give a signal at pin 3 of operational amplifier U1A that when amplified by U1A's gain of approximately 2 will provide a signal to the input of the modified window comparator circuit U2A–U2B, whose DC level is centered in the threshold window described by reference voltage dividers 52 and 54, respectively. When the input is centered in the window, the outputs $\overline{HFAULT}$ and $\overline{LFAULT}$ will be held to logic 1. When transformer 12 load conditions cause the input signal to rise enough that the DC level at U2A-4 is above the window's upper threshold 9, 52, the $\overline{HFAULT}$ output will go to logic 0. Likewise, if the signal level at U2B-7 goes below the window's lower threshold 10, 54, the $\overline{LFAULT}$ output will go to logic 0.

Logic Circuit 34

Referring now to FIG. 4 and 8, when the power is first turned on, the circuit comprised of U5A, U5B, U5C and U6D act as a power up one shot to generate a pulse delayed approximately 1.5 seconds to allow power supply stabilization.

The circuit comprised of U7A, U8 and U20A is a digital type of one shot. When triggered by U5D it produces 1 second pulse outputs called INITIALIZE, and $\overline{INITIALIZE}$. The function of these signals is to reset key logic functions to the initial state.

The circuit comprised of U7B, U9 and U20B also comprise a digital one shot. The output is a 122 microsecond pulse called $\overline{START}$. Its function is to initiate the turn on process. It is triggered by the $\overline{INITIALIZE}$ signal routed through the normally closed contacts of the press to adjust switch 42, as shown in FIG. 8. It will be inhibited if the switch is pressed or if the FHOLD 2 signal is present at U5F.

When the press to adjust switch is pressed, U26D generates a momentary on signal (MOMON) that triggers the INITIALIZE one shot (U7A–US).

Referring to FIG. 5, when the $\overline{\text{START}}$ signal goes low it triggers digital one shot U10A, and U11. The outputs of this one shot are called SETTLE 1 and $\overline{\text{SETTLE 1}}$. Their function is to command the drive circuitry to turn on power to transformer primary 14 and to inhibit fault detection until the luminous tube gas ionization stabilizes. The length of SETTLE 1 is determined as follows: three output pulses of 0.2, 0.4 and 0.8 second duration are simultaneously generated by U11 and sent to the temperature compensation circuit 30, FIG. 3. The temperature compensation circuit 30 will select one of these pulses, based on the ambient air temperature, and send it back to U20C to terminate the SETTLE 1 signal. If the ambient air temperature exceeds the upper or lower limit, the temperature compensation circuit will send a logic 1 to U20C to inhibit the SETTLE 1 pulse and thereby prevent primary power turn on.

When $\overline{\text{SETTLE 1}}$ signal terminates, type D Flip-Flop U10B is set and the Q output called $\overline{\text{HOLDGATE 1}}$ goes to logic 0. This is then applied to OR gates U21A and U21B. Also present at these gates is $\overline{\text{HFAULT}}$ and $\overline{\text{LFAULT}}$. If the luminous tube is operating normally those signals are both at logic 1. If a fault occurs, example $\overline{\text{HFAULT}}$, $\overline{\text{HFAULT}}$ goes low and sets R-S Latch U12. The Q output, HFHOLD 1, generates FHOLD 1 at U21C which triggers one shot U13A, U14 and U21D to produce a 10 second signal called SIGNOFF which tells the drive circuit 36 to turn primary power off. At the end of SIGNOFF one shot U13B, U15 and U22A generates SETTLE 2 the same as SETTLE 1 except no temperature compensation. The fault detection process is then repeated with U22C, U22D, U12 and U23A. Detection of a second fault will result in FHOLD 2 at U23A.

Figure 6A:
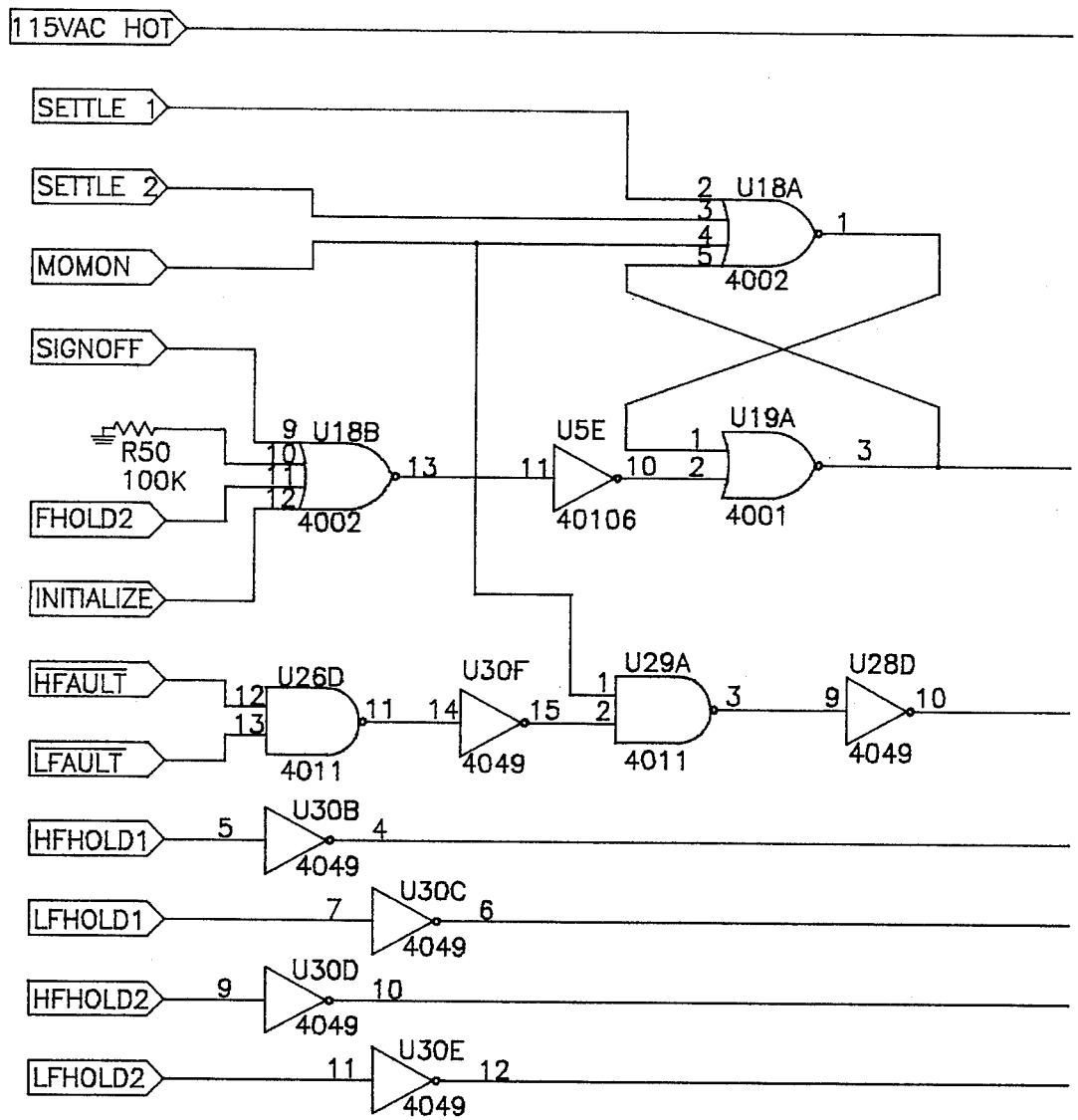
Figure 6B:
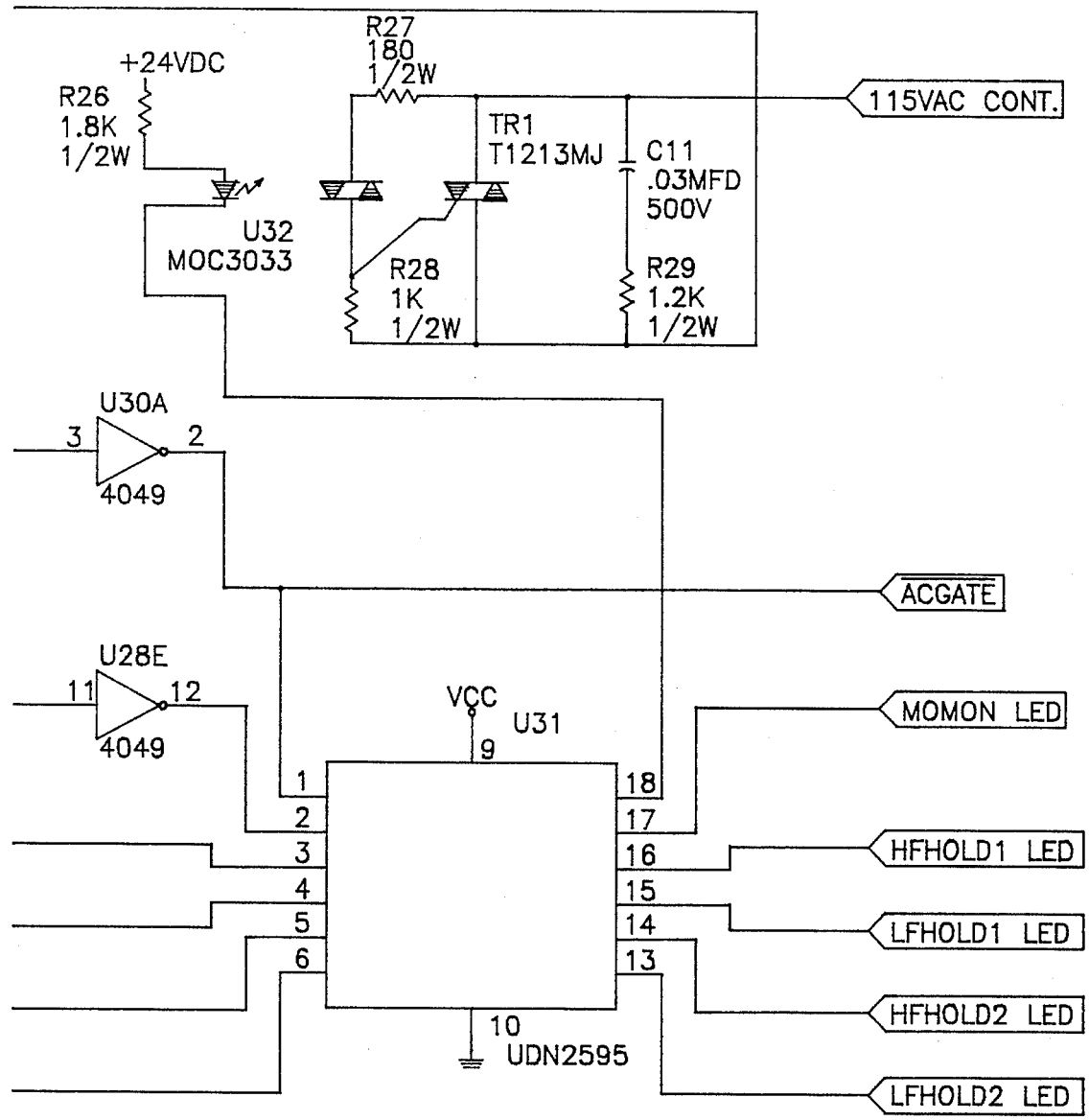
Figure 7A:
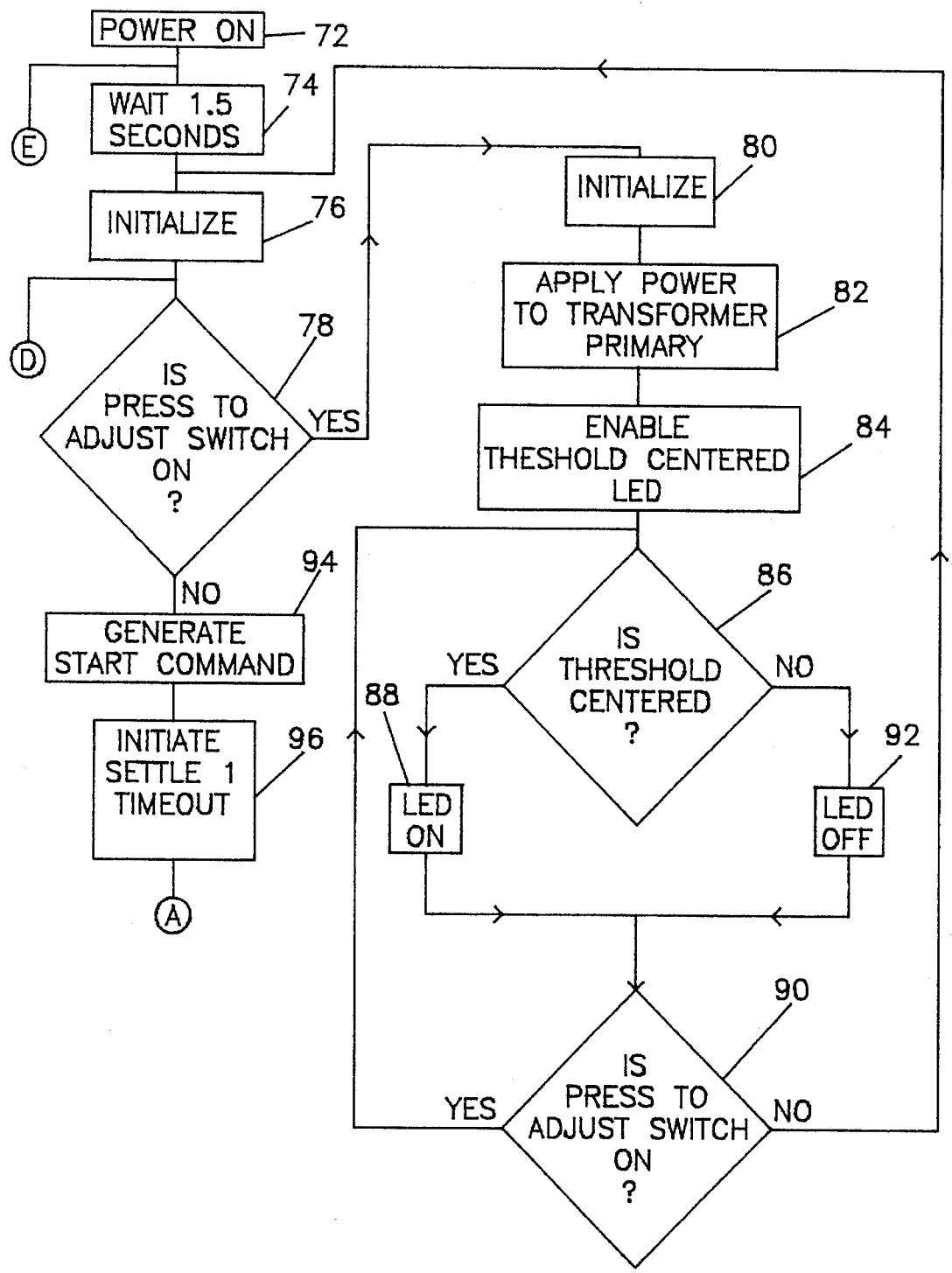
FIG. 7 is a logic flow diagram of the operation of the present invention.
Figure 7B:
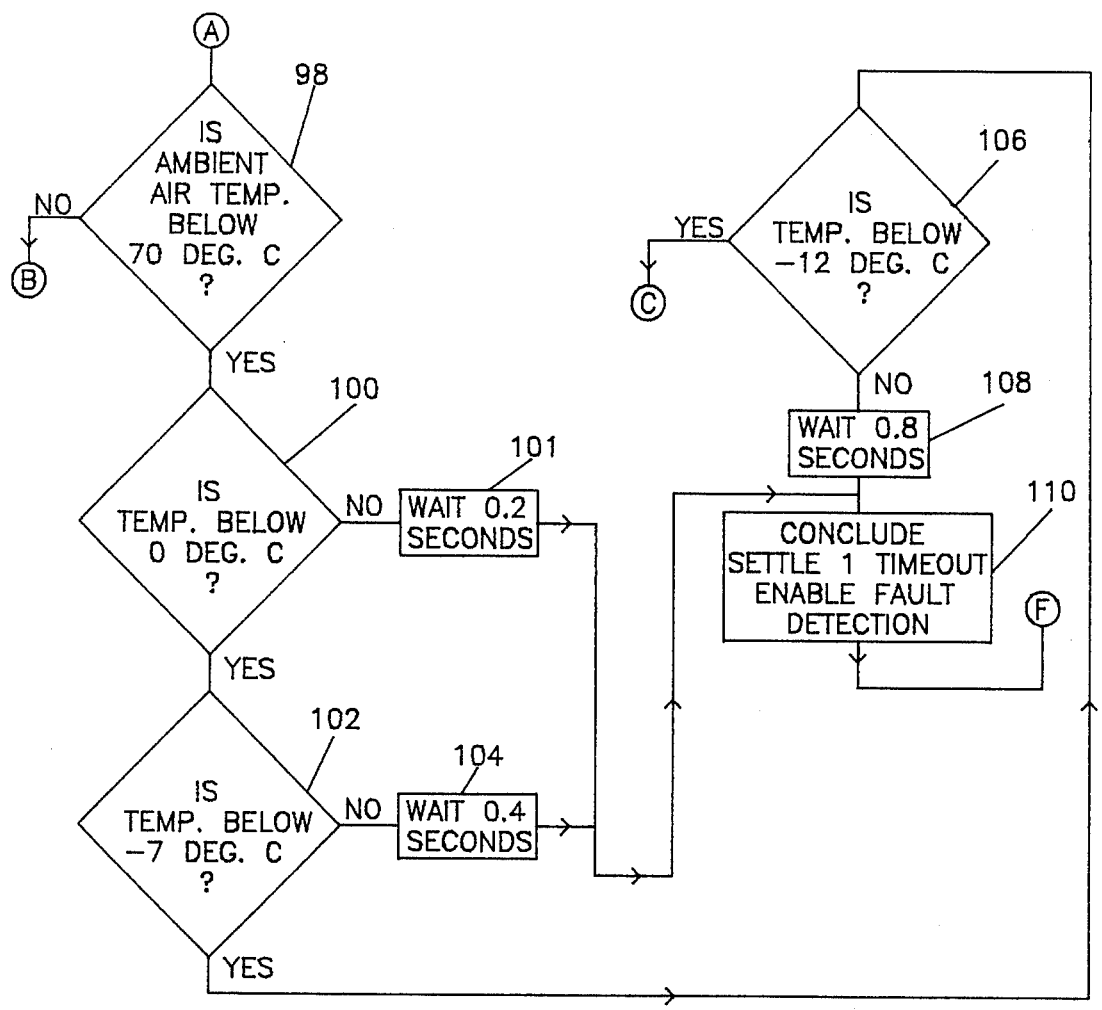
Figure 7C:
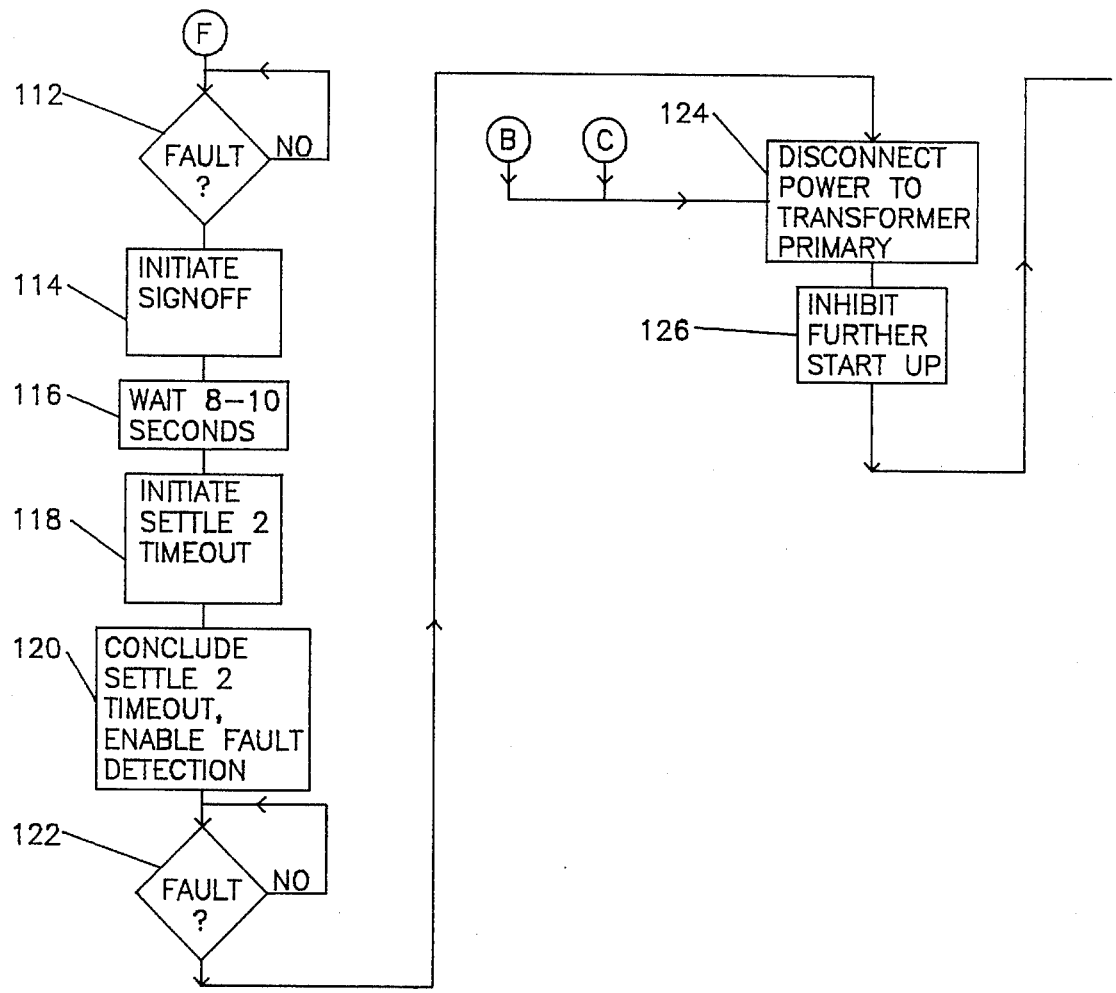
Figure 7D:
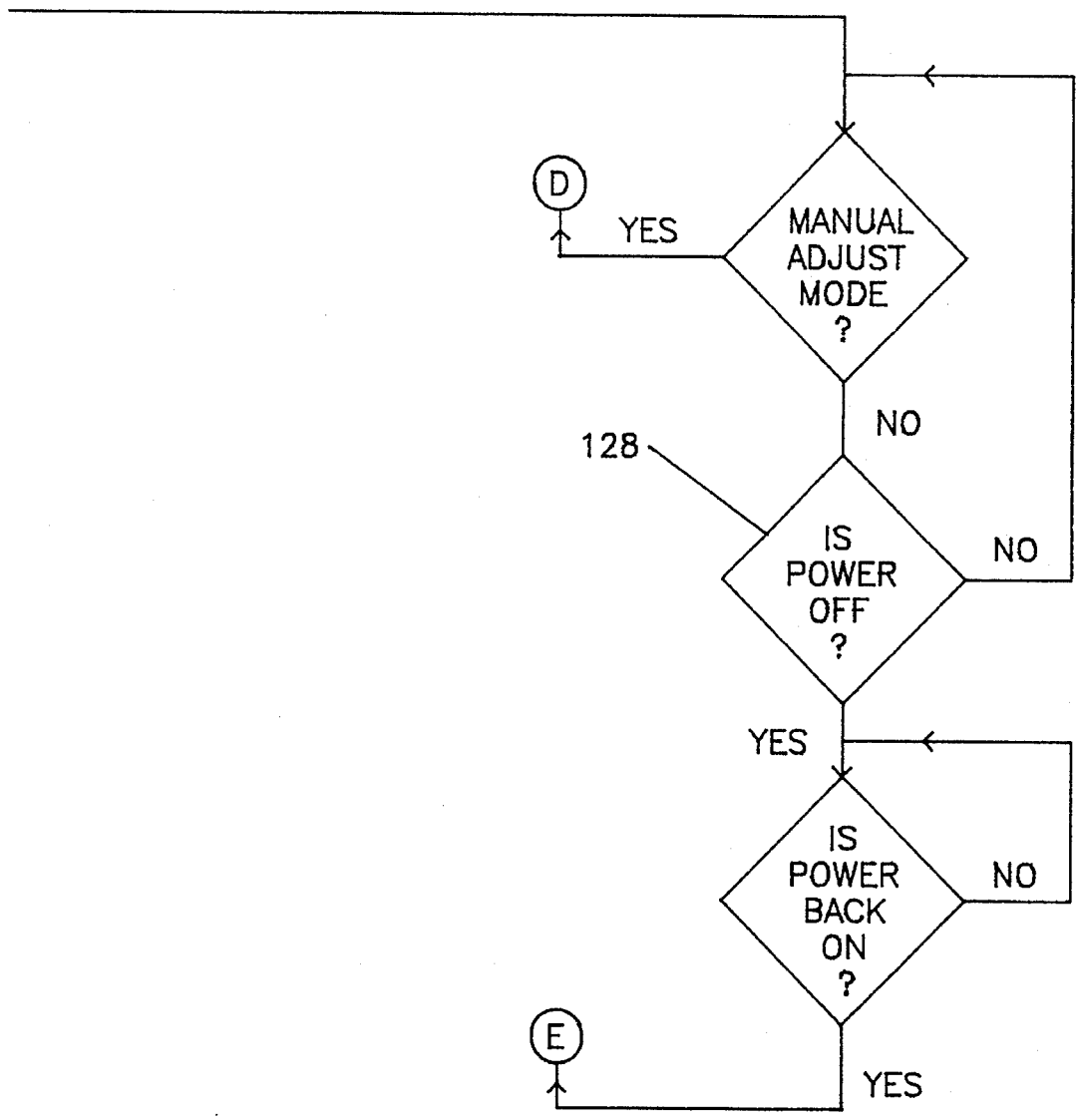

Referring to FIG. 6, U18A, U18B, U5E and U19A comprise a latch circuit the output of which is called ACGATE. ACGATE is inverted by U30A to become $\overline{\text{ACGATE}}$. This is the signal that tells the drive circuit 36 to switch the triac on or off. The logic for ACGATE is: ACGATE= $\overline{(\text{INITIALIZE}+\text{FHOLD}-2+\text{SIGNOFF}+\text{ASF}).(\text{SETTLE1}+\text{SETTLE2}+\text{MOMON})}$. The latch functions as follows: At power up the INITIALIZE signal goes to logic 1 for 1 second, while all other inputs to U18A&B are logic 0. This sets the latch output to logic 0. U19A=0=ACGATE off. From previous discussion, when INITIALIZE goes back to zero after 1 second, START initiates SETTLE 1 for a predetermined time of 0.2–0.8 seconds. When SETTLE 1 goes to a 1, the latch is then set to a logic 1. ACGATE is now on and will remain on until one of the inputs to U18B goes to a logic 1. A logic 1 on any U18B input will reset the latch to a zero, turning ACGATE off. In simple terms, a logic 1 on any U18A input will turn ACGATE on. A logic 1 on any U18B input will turn ACGATE off.

Driver Circuit 36

Referring to FIG. 6, when ACGATE, U19A, is on (logic 1), $\overline{\text{ACGATE}}$ is logic 0. This is applied to the input of U31. U31 is a current-sink/driver with active low inputs and open collector outputs. When $\overline{\text{ACGATE}}$ is a logic 0, U31 output turns on applying a ground to the input of optoisolator U32, turning it on.

U32 is an optoisolator triac driver with a zero crossing switch. Therefore, when the U32 input turns on, the output will turn on the next time the line voltage goes through zero. This switches on TR1 and applies line voltage to the primary of the luminous tube transformer 12.

U26D, U29A and U30F comprise a gate circuit to turn on the front panel threshold centered LED 40. The logic for this LED is: Threshold Centered=MOMON·$\overline{\text{HFAULT}}$·$\overline{\text{LFAULT}}$. Referring to the LED FIGS. 6 and 8, this means 40 will be on when the front panel press to adjust switch 42 is pressed and the detected signal is within the comparator window ($\overline{\text{HFAULT}}$ and $\overline{\text{LFAULT}}$ are both logic 1).

Temperature Compensation Circuit 30

Figure 3A:
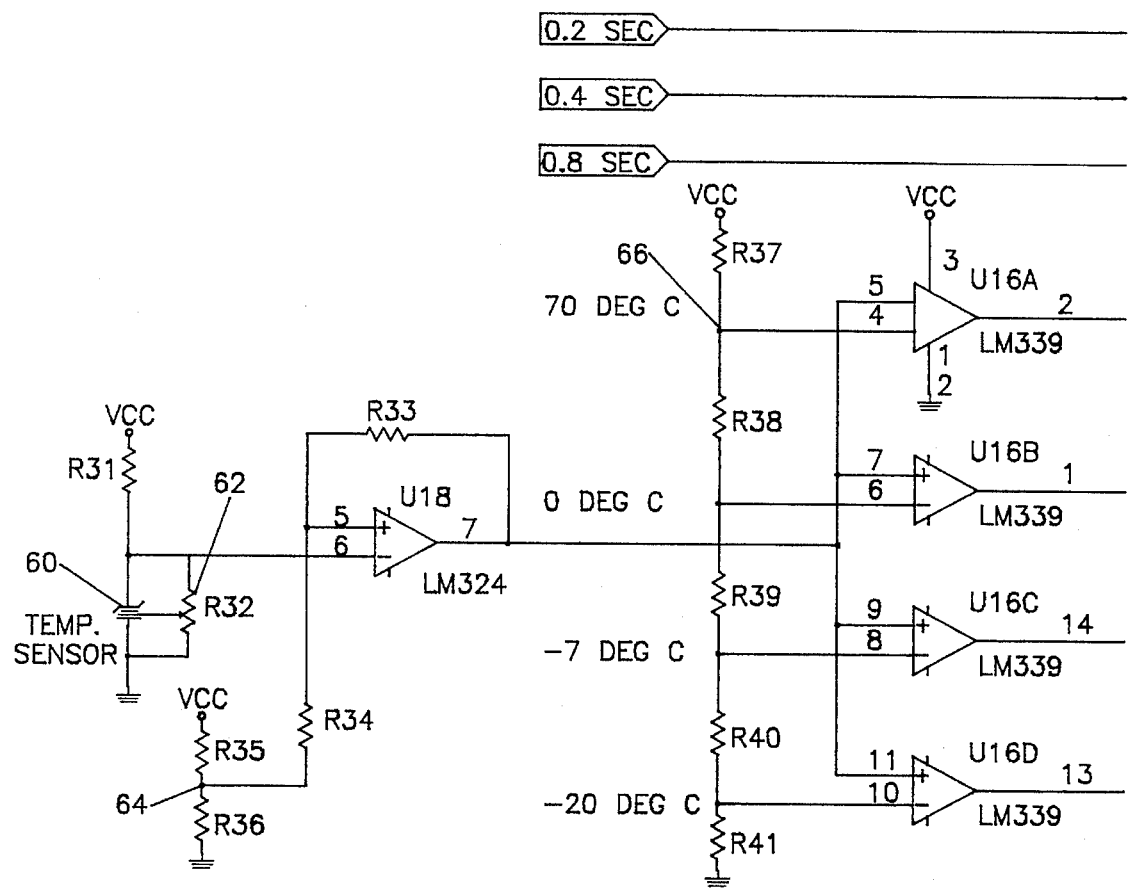
FIG. 3 is an electrical schematic of the temperature sensing and compensation circuit.
Figure 3B:
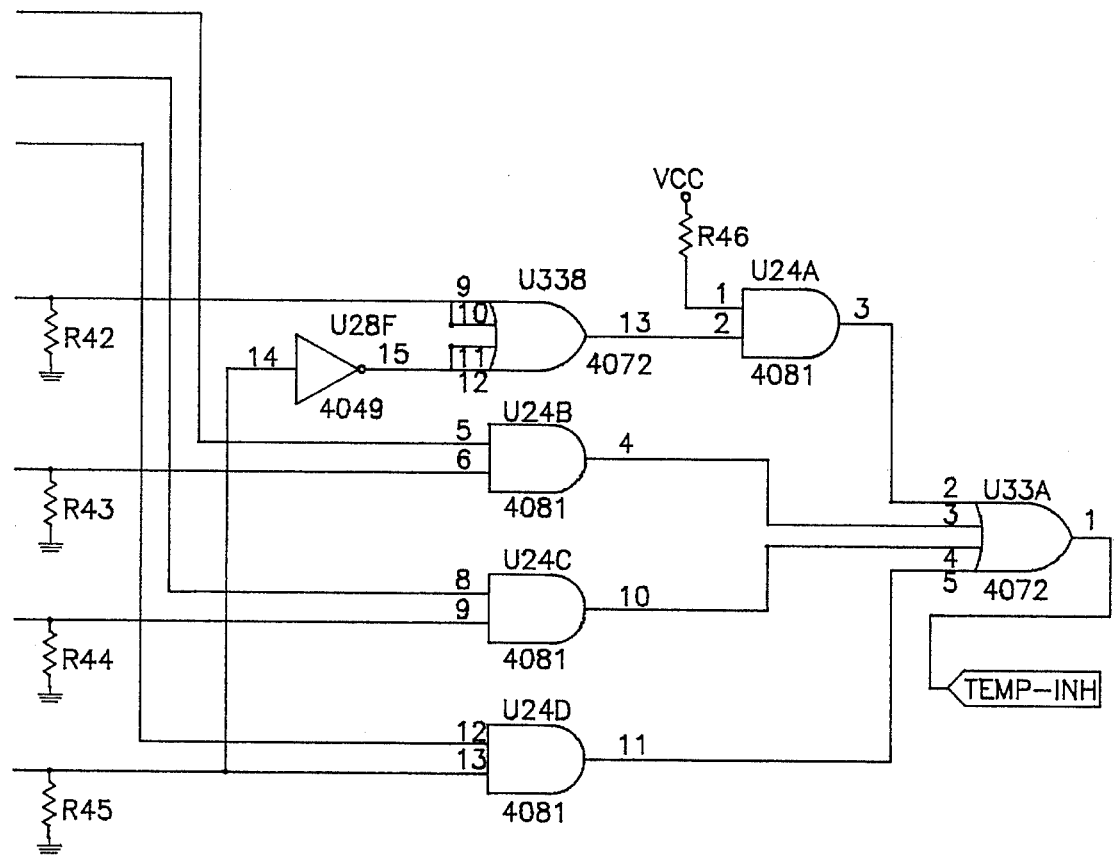
Figure 4A:
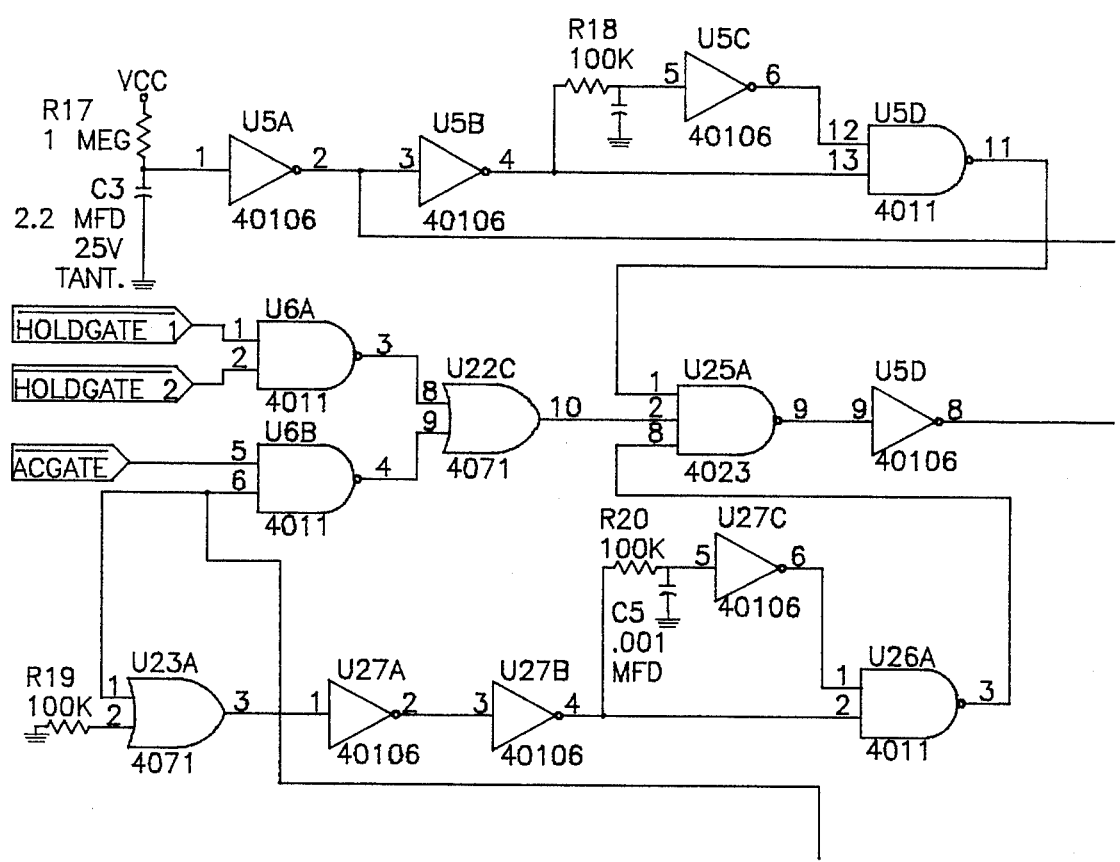
FIG. 4, 5 and 6 are electrical schematics of interconnected parts of the logic and driver circuits of the present invention.
Figure 4B:
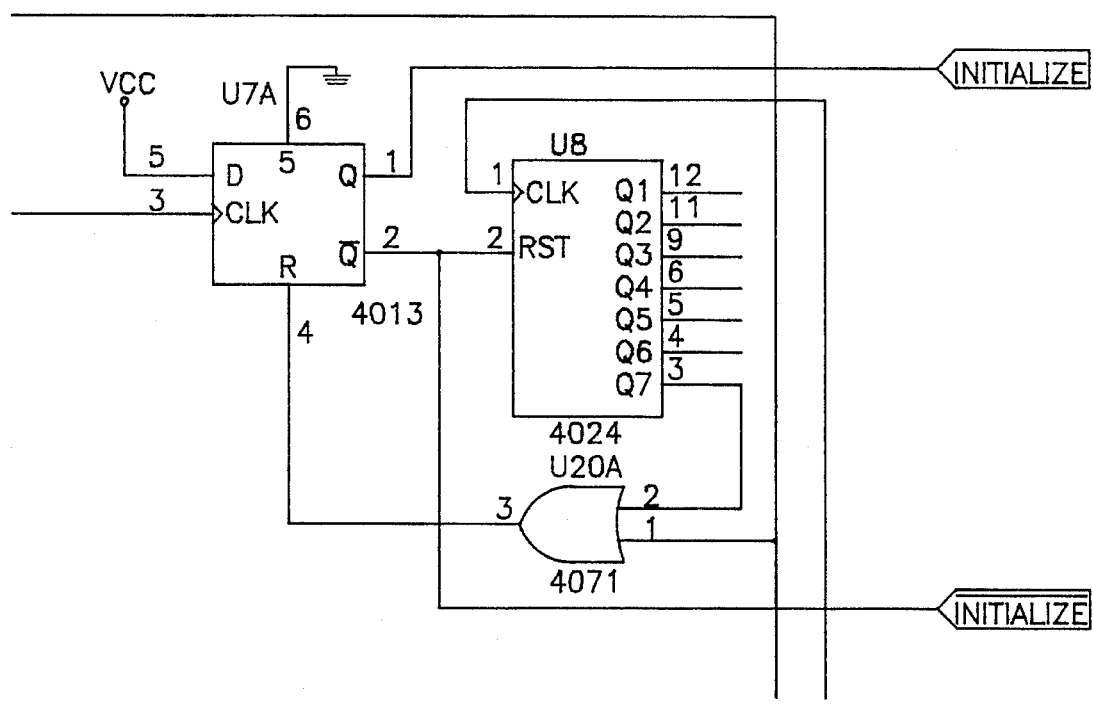
Figure 4C:
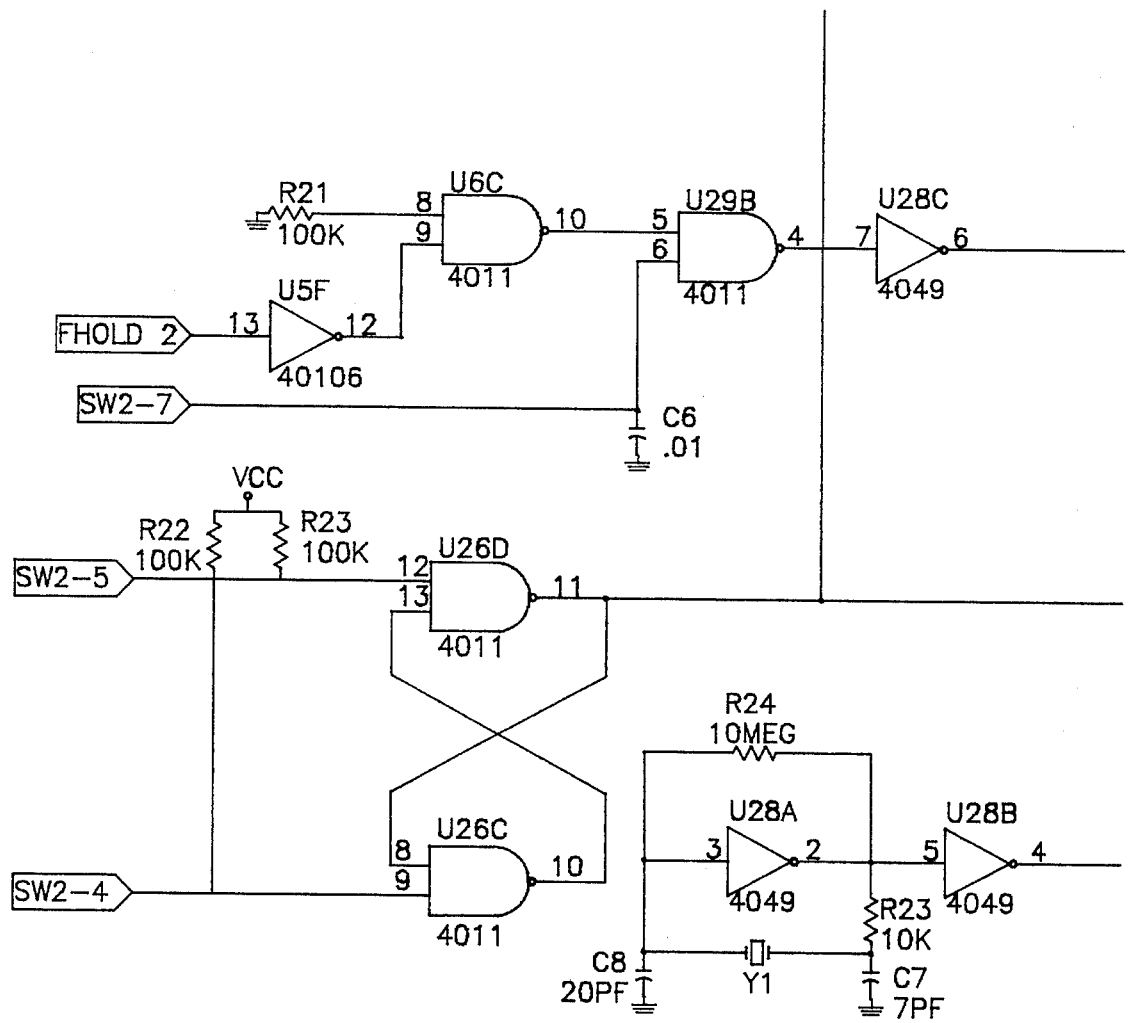
Figure 4D:
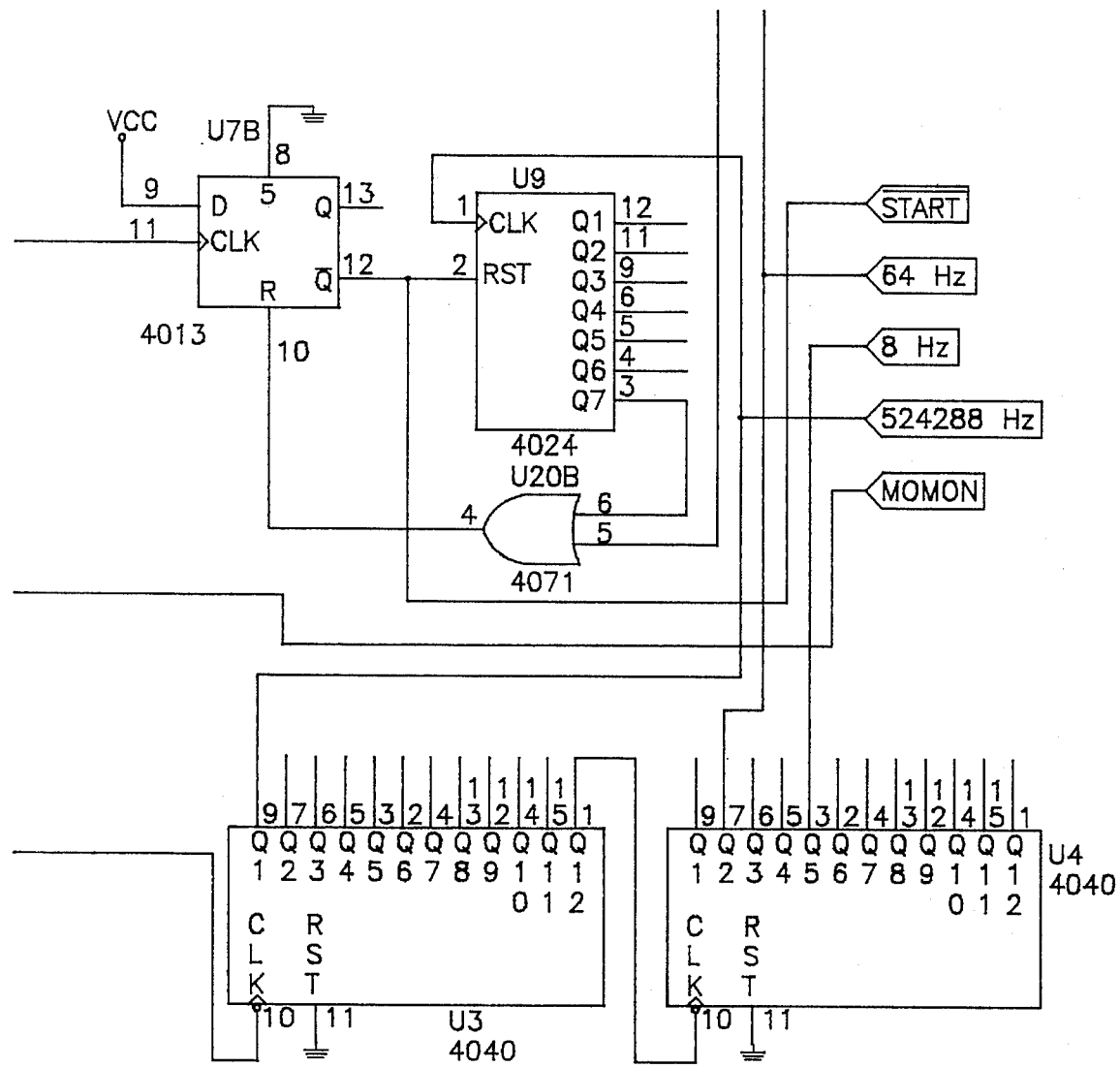
Figure 5A:
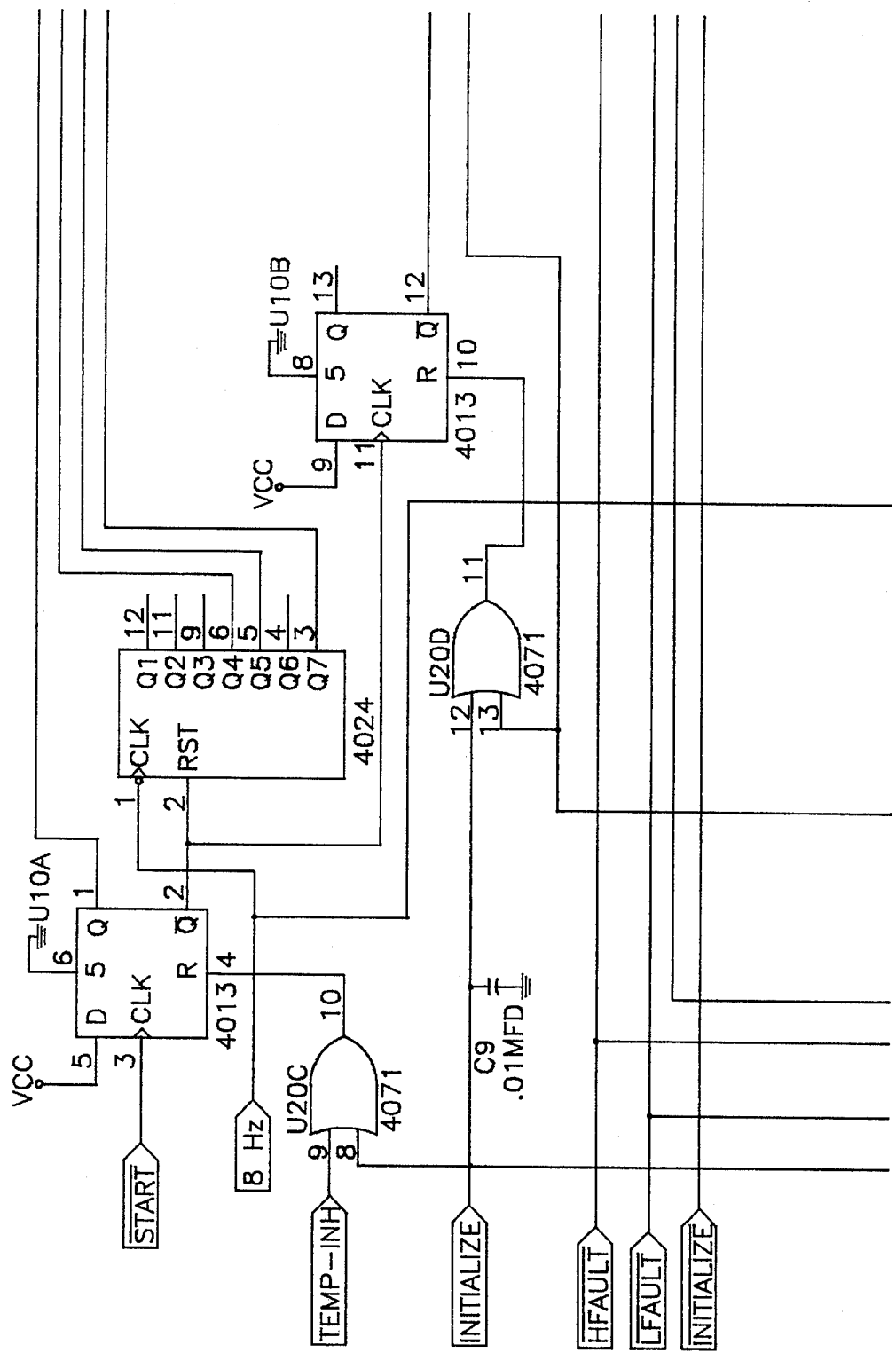
Figure 5B:
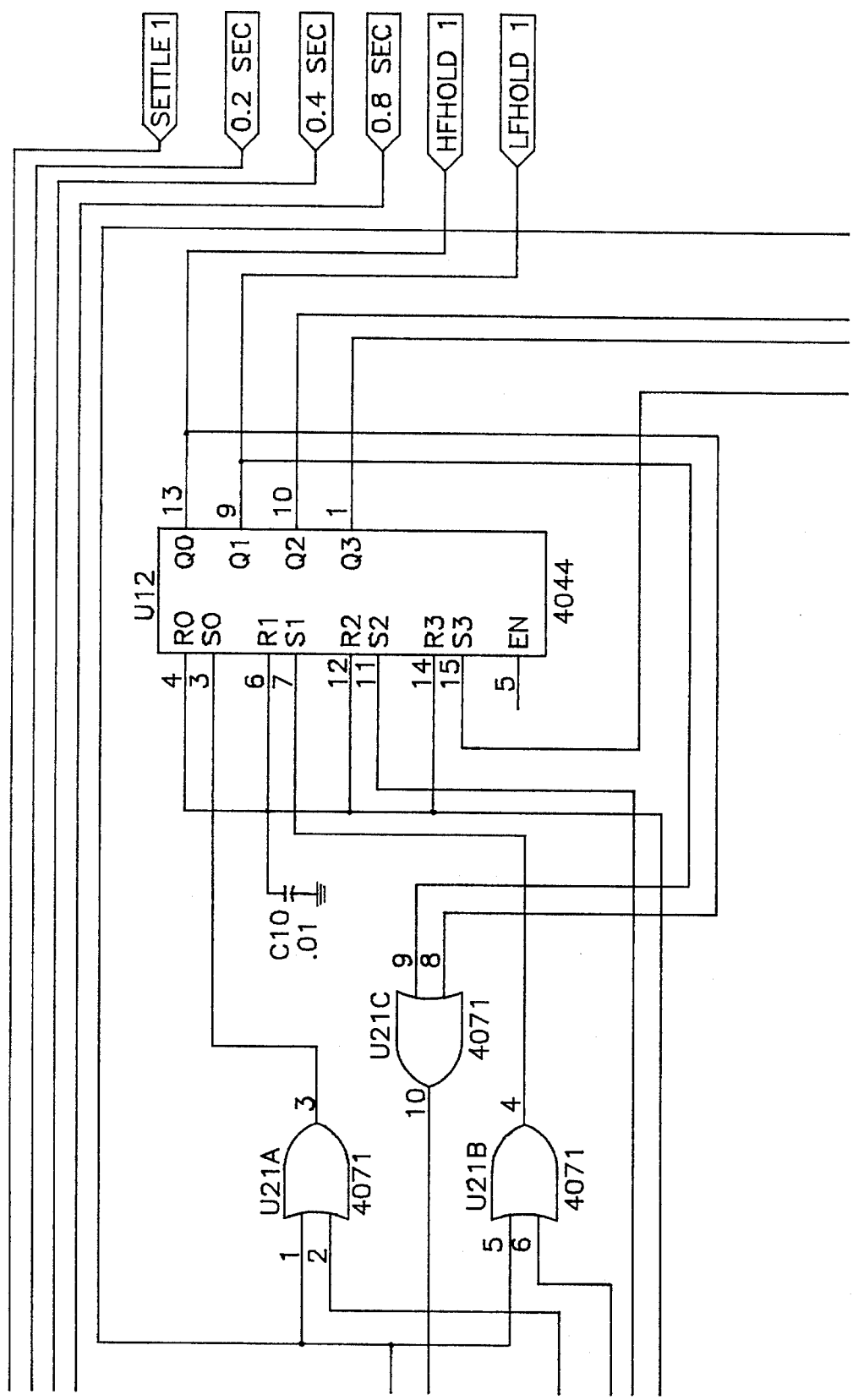
Figure 5C:
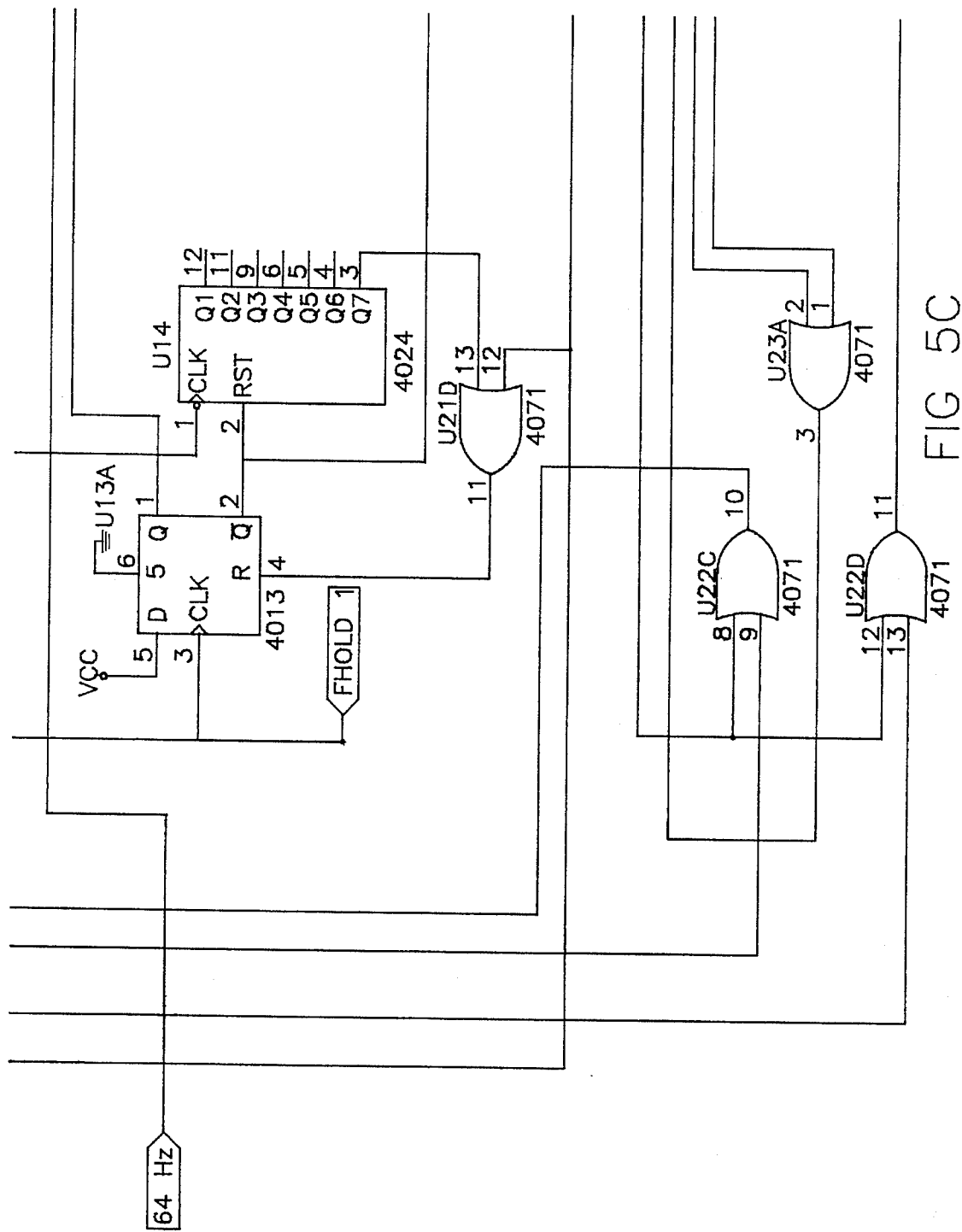
Figure 5D:
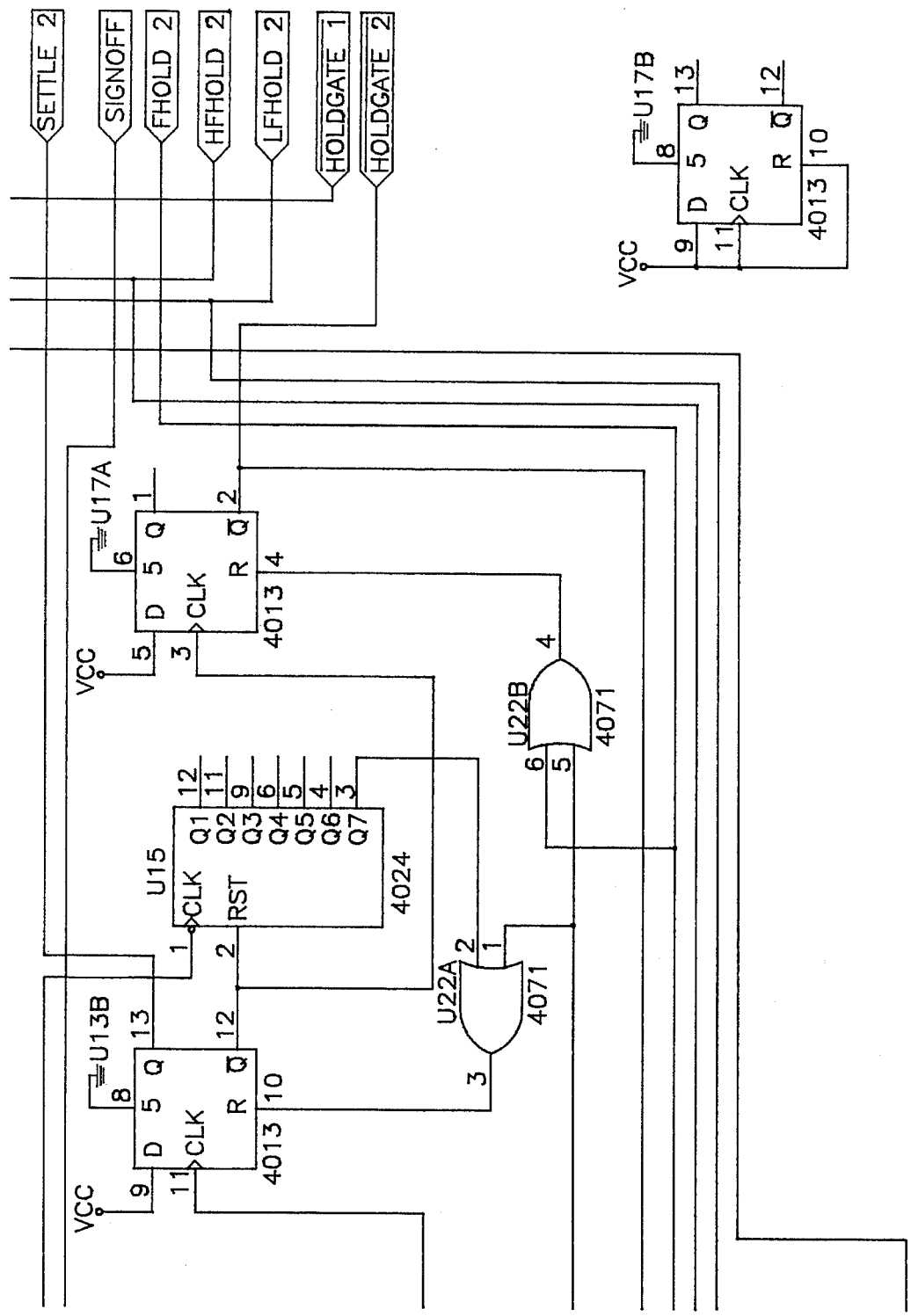

Referring to FIG. 3, the temperature sensor 60 is a 3 terminal integrated circuit. It is calibrated by the potentiometer 62 and referenced to 0° C. by the voltage divider 64. U16 comprises a 4 point voltage comparator circuit. The 4 points are determined by voltage divider string 66. Using U16C as an example, the temperature input is applied to the non-inverting input (+) and the voltage divider −7° C. point is tied to the inverting input (−). If the temperature is below −7° C. the output of U16C will be a logic 0. If the temperature goes above −7° C. the output of U16C is applied to one input of an AND gate, U24C. Applied to the other input of U24C is a positive pulse, signal 0.4 sec. from U11 (FIG. 5). That is, the pulse goes positive 0.4 seconds after SETTLE 1 goes to logic 0. With the logic 1 from U16C on one input, the AND gate is enabled and will pass the 0.4 second pulse on to the input of U33A. From U33A the pulse goes on to U20C where it terminates the timeout of the SETTLE 1 one shot. This produces a SETTLE 1, and $\overline{\text{SETTLE 1}}$ signal 0.4 seconds duration.

If the temperature is below −20° C., the output of U16D will be logic 0. This disables AND gate U24D but it also goes to U28F where it is inverted to logic 1 and applied to OR gate U33B. Also, if the temperature is above +70° C. U16A output goes to logic 1 and is applied to the other input of U33B. Therefore, if the temperature is below the minimum limit (−20° C.) or above the maximum limit (+70° C.), the AND gate U24A will be enabled and a constant logic 1 will be sent to U20C preventing the SETTLE1 one shot from ever turning on.

Referring to FIG. 8, there is shown an electrical schematic of the front panel control circuitry. A power switch S11, such as a push on/off switch, is provided to initiate to terminate the provision of power through a connector J1 to the various circuits and components of the present invention from, for example, an outside power supply. The threshold adjusting potentiometer 28, the press to adjust switch 42, and the threshold centered LED 40, all described previously, are connected through a connector J2 to the various other components and circuits identified as connected thereto, and found elsewhere in the drawings of the present application, also as identified in FIG. 8. A "power on" LED is also provided, connected to connector J2 along with the threshold centered LED 40, to indicate when the power to the present invention is on.

Referring now to FIG. 7, a logic flow diagram, generally indicated by the reference 70 is provided for indicating the operation of the circuit 10. In step 72 the power supply 16 is turned on, step 74 provides a wait and 76 allows the circuitry to initialize. In order to calibrate the circuit 10 step 78 provides that the adjusting switch 42 connected to the logic 34 is depressed and after initialization in step 80, power is applied in step 82 to the transformer 12 to enable the threshold centered LED 40 in step 84. The sensors 22 and 24 provide an output signal through the detector/ comparator 26 and step 86 determines whether the output signal is centered in the window limits of the comparator. If the answer is yes the LED 40 is turned on in step 88 and the press to adjust switch 42 may be released as the circuit is calibrated. This is determined in step 90 and if the adjust switch 42 is released, the logic flow returns to step 76. However, if step 92 indicates that the LED 40 was off, the threshold adjusting potentiometer 28 is adjusted with the adjust switch 42 depressed until step 88 indicates at the output signal from the sensors within the window limits of the comparator.

After adjustment, step 94 starts the logic, and in step 96 power is applied to a driver 36.

Signals are then received from the temperature compensation circuit 30 to determine the ambient air temperature. In step 98 if the ambient air temperature is above 70° C. power to the transformer is shut off as will be more fully described hereinafter. However, if the temperature is below 70° C., the logic proceeds to step 100. If the temperature is below 70° and above 0° C., the logic proceeds to step 101, and waits 0.2 seconds before enabling the fault detection circuit. However, if the temperature is below 0° C., step 102 is encountered to provide an additional time delay to allow the neon tubes 20 to stabilize by 0.4 seconds in step 104 before enabling the fault detection circuit. However, if the temperature is below −7° C. logic step 106 is provided to create a longer time delay of 0.8 seconds in step 108. However, if the temperature is below −20° C., power to the transformer is inhibited as will be more fully described hereinafter.

Assuming that ambient air temperature is within the predetermined limits, the logic in step 110 enables the fault detection and a fault determination is made in step 112. So long as no fault is detected, the step 112 continues to operate and to monitor for faults.

In the event a fault is detected, step 114 is provided to discontinue power from the transformer 12 and step 116 provides a 10 second delay. After the 10 second delay, step 118 is provided to apply power to driver 36 and to inhibit fault detection. In step 120 the fault detection is again enabled and a fault determination is made in step 122. If no fault is detected the circuit will continue to operate and to again monitor for a fault.

However, if a fault is detected, step 124 disconnects power to the transformer 12. Also if the ambient air temperature was determined to be above the maximum or below the minimum, the circuitry is inhibited from further start up in step 126. In order to again initialize the circuitry 10 step 128 provides for manual adjustment for recalibrating and resetting the circuit 10.

The invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

We claim:

1. A protection circuit for monitoring the power from a luminous tube transformer to a luminous tube in which the transformer includes a primary winding connected to a power supply and a secondary winding connected to a luminous tube, comprising:

sensor means connected to the secondary of the transformer for directly sensing the full cycle voltage waveform on the secondary winding of the transformer and providing an output, a detector means receiving the output from said sensor means, said detector means including rectifying, smoothing and summing means for providing an output indication of the voltage across the secondary of said transformer, said output indication providing a fault detection signal within one cycle of the primary voltage, a window comparator circuit connected to and receiving the detector output, said window comparator circuit being provided with window limits based on voltage, said window comparator circuit providing a fault signal when said detector output exceeds the window limits, and a driver connected to said window comparator circuit and to the transformer primary for disconnecting the power supply to the primary when said driver receives a fault signal.

2. The circuit of claim 1 including signal adjusting means for setting said output from the sensor means within said window limits of the window comparator circuit.

3. A protection circuit for monitoring the power from a luminous tube transformer to a luminous tube in which the transformer includes a primary winding connected to a power supply and a secondary winding connected to a luminous tube, comprising:

sensor means connected to the secondary of the transformer for directly sensing the full cycle voltage waveform on the secondary winding of the transformer and providing an output, a detector means receiving the output from said sensor means, said detector means including rectifying, smoothing and summing means for providing an output indication of the voltage across the secondary of said transformer, said output indication providing a fault detection signal within one cycle of the primary voltage, a window comparator circuit connected to and receiving the detector output, said window comparator circuit being provided with window limits based on voltage, said window comparator circuit providing a fault signal when said detector output exceeds the window limits, a driver connected to said window comparator circuit and to the transformer primary for disconnecting the power supply to the primary when said driver receives a fault signal, means for measuring ambient air temperature at the luminous tube, and means for providing a delay in disconnecting the power supply until the luminous tube voltage stabilizes.

4. The circuit of claim 3 including a temperature compensation circuit which prevents connection of the power supply to the transformer primary in the event ambient air temperature at the luminous tube is above a defined maximum temperature or below a defined minimum temperature.

5. A protection circuit for monitoring the power from a luminous tube transformer to a luminous tube in which the transformer includes a primary winding connected to a power supply and a secondary winding connected to a luminous tube, comprising:

first and second sensors connected to the secondary of the transformer for directly sensing the full cycle voltage waveform on the secondary winding of the transformer and producing reduced signal output, a detector circuit connected to said sensors and receiving said reduced signal output, said detector circuit including adjusting means for setting a signal level from said detector circuit, and rectifying, smoothing, and summing means for providing a fault detection signal within one cycle of the primary voltage, a window comparator circuit connected to and receiving the signal from said detector circuit, wherein said window comparator circuit is provided with window limits based on voltage, said window comparator circuit providing a high fault and a low fault signal when the signal from said detector circuit exceeds said window limits, a temperature compensation circuit for monitoring ambient air temperature at the luminous tube, a digital logic circuit connected to said window comparator circuit and to said temperature compensation circuit, said logic circuit monitoring the high fault, low fault, and ambient air temperature at the luminous tube, and a driver connected to said logic circuit and to said transformer primary for switching the power supply to the primary off when said driver receives a fault signal.

6. The circuit of claim 5 wherein said driver includes a triac switch driven by a zero crossing detector for enabling the power supply to be disconnected within one-half cycle.

7. The circuit of claim 5 wherein said temperature compensation circuit prevents connection of the power supply to the transformer primary in the event ambient air temperature at the luminous tube is above a defined maximum temperature or below a defined minimum temperature.

8. The circuit of claim 5 wherein said temperature compensation circuit includes time delay means for providing a delay in disconnecting the power supply said time delay means being variable and depending upon ambient air temperature at the luminous tube.

9. A protection circuit for monitoring the power from a luminous tube transformer to a luminous tube in which the transformer includes a primary winding connected to a power supply and a secondary winding connected to a luminous tube, said protection circuit comprising:

a sensor connected to the secondary of the transformer for directly sensing the full cycle voltage waveform on the secondary winding and providing a sensor output signal;

a detector circuit receiving the sensor output signal, said detector circuit rectifying, smoothing and summing said sensor output signal to provide a voltage output indication of the voltage across the secondary of said transformer;

a window comparator circuit connected to said detector circuit and receiving the detector voltage output indication;

said window comparator circuit being provided with window limits based on voltage;

said window comparator circuit providing a fault signal when said detector voltage output indication exceeds the window limits;

said window comparator circuit providing said fault signal within one cycle of the voltage on said primary winding and a driver connected to said window comparator circuit and to the transformer primary for disconnecting the power supply to the primary when said driver receives said fault signal, the power supply being disconnected upon the occurrence of a fault condition and within one cycle of the voltage on said primary winding after said fault condition arises.

10. The protection circuit of claim 9 wherein said protection circuit includes a signal adjusting circuit for setting said output from the sensor within said window limits of the window comparator circuit.

11. The protection circuit of claim 9 wherein said fault condition comprises a fault detected by said window comparator circuit.

12. The protection circuit of claim 9 wherein said sensor comprises a resistor.

13. A protection circuit for monitoring the power from a luminous tube transformer to a luminous tube with ionized gas in which the transformer includes a primary winding connected to a power supply and a secondary winding connected to a luminous tube, said protection circuit comprising:

a sensor connected to the secondary of the transformer for directly sensing the full cycle voltage waveform on the secondary winding and providing a sensor output signal;

a detector circuit receiving the sensor output signal, said detector circuit rectifying, smoothing and summing said sensor output signal to provide a voltage output indication of the voltage across the secondary of said transformer;

a window comparator circuit connected to said detector circuit and receiving the detector voltage output indication;

said window comparator circuit being provided with window limits based on voltage;

said window comparator circuit providing a fault signal when said detector voltage output indication exceeds the window limits;

said window comparator circuit providing said fault signal within one cycle of the voltage on said primary winding;

a driver connected to said window comparator circuit and to the transformer primary for disconnecting the power supply to the primary when said driver receives said fault signal, the power supply being disconnected upon the occurrence of a fault condition and within one cycle of the voltage on said primary winding after said fault condition arises;

a temperature compensation circuit for measuring ambient air temperature at the luminous tube; and said temperature compensation circuit providing a delay in disconnecting the power supply until said luminous tube gas ionization stabilizes.

14. The protection circuit of claim 13 wherein said driver prevents connection of the power supply to the transformer primary in the event ambient air temperature at the luminous tube is outside a defined temperature range as monitored by said temperature compensation circuit.

15. The protection of claim 13 wherein said fault condition includes an over-temperature condition.

16. The protection circuit of claim 13 wherein said fault condition includes an under-temperature condition.

17. The protection circuit of claim 13 wherein said fault condition comprises a fault detected by said window comparator.

18. A protection circuit for monitoring the power from a luminous tube transformer to a luminous tube in which the transformer includes a primary coil connected to a power supply and a secondary winding connected to a luminous tube, said protection circuit comprising:

- a plurality of sensors connected to the secondary of the transformer for directly sensing the full cycle voltage waveform on the secondary winding of the transformer and producing a sensor output signal that is a reduced form of the voltage across the secondary;
- a detector circuit connected to said sensors and receiving said sensor output signal, said detector circuit including an adjusting circuit for setting a signal level from said detector circuit, and rectifying, smoothing, and summing said sensor output signal to provide a voltage output indication;
- a window comparator circuit connected to and receiving the voltage output indication from said detector circuit, wherein said window comparator circuit is provided with window limits based on voltage;
- said window comparator circuit providing a high fault signal and a low fault signal when the signal from said detector circuit exceeds said window limits, said high fault and low fault signals being provided within one cycle of the voltage on said primary winding;
- a temperature compensation circuit for monitoring ambient air temperature at the luminous tube;
- a digital logic circuit connected to said window comparator circuit and to said temperature compensation circuit, said logic circuit monitoring the high fault, low fault, and ambient air temperature at the luminous tube; and
- a driver connected to said logic circuit and to said transformer primary for switching the power supply to the primary off upon detection of a fault condition by the protection circuit.

19. The protection circuit of claim 18 wherein said driver includes a solid state switch driven by a zero crossing detector for enabling the power supply to be disconnected within one-half cycle of the voltage waveform on said primary winding.

20. The protection circuit of claim 19 wherein said solid state switch comprises a triac device.

21. The protection circuit of claim 18 wherein said temperature compensation circuit prevents connection of the power supply to the transformer primary in the event ambient air temperature at the luminous tube is outside a defined range as monitored by said temperature circuit.

22. The protection circuit of claim 18 wherein said temperature compensation circuit includes a time delay for providing a delay in disconnecting the power supply, said time delay being variable and depending upon ambient air temperature at the luminous tube.

23. The protection circuit of claim 18 wherein said fault condition includes an over-temperature condition.

24. The protection circuit of claim 18 wherein said fault condition includes an under-temperature condition.

25. The protection circuit of claim 18 wherein said fault condition comprises a fault detected by said window comparator circuit.

26. The protection circuit of claim 18 wherein said driver prevents connection of said power supply to said primary winding if said ambient air temperature at the luminous tube is outside a defined temperature range as monitored by said temperature circuit.

27. The protection circuit of claim 14 wherein said sensors comprise resistors.

* * * * *